United States Patent
Freitag

(10) Patent No.: US 6,577,973 B1
(45) Date of Patent: Jun. 10, 2003

(54) METHOD AND DEVICE FOR TAKING INTO ACCOUNT FRICTION LOSSES DURING THE SIMULATION OF MASSES ON STATIONARY TEST BENCHES

(75) Inventor: Gernot Freitag, Darmstadt (DE)

(73) Assignee: Schenk Pegasus GmbH, Darmstadt (DE)

( * ) Notice: Subject to any disclaimer, the term of this patent is extended or adjusted under 35 U.S.C. 154(b) by 0 days.

(21) Appl. No.: 09/762,902

(22) PCT Filed: Aug. 12, 1999

(86) PCT No.: PCT/EP99/05875

§ 371 (c)(1),
(2), (4) Date: Feb. 13, 2001

(87) PCT Pub. No.: WO00/09982

PCT Pub. Date: Feb. 24, 2000

(30) Foreign Application Priority Data

Aug. 13, 1998 (DE) .......... 198 36 711

(51) Int. Cl.⁷ .......... G01D 18/00; G01D 21/00
(52) U.S. Cl. .......... 702/85; 73/117.1
(58) Field of Search .......... 73/117, 117.1, 73/147, 865.6; 702/33, 85, 96, 101, 102, 127

(56) References Cited

U.S. PATENT DOCUMENTS

| | | | | |
|---|---|---|---|---|
| 3,930,409 A | * | 1/1976 | Ostrander et al. | 73/117 |
| 4,055,996 A | * | 11/1977 | Dinkelacker et al. | 73/117 |
| 4,077,255 A | * | 3/1978 | Murakami | 73/117 |
| 4,134,291 A | | 1/1979 | Gregoire | |
| 4,435,987 A | * | 3/1984 | Sugimoto | 73/862.17 |
| 4,745,799 A | * | 5/1988 | Kawarabayashi et al. | 73/117 |
| 5,375,460 A | * | 12/1994 | La Belle | 73/117 |
| 5,385,042 A | * | 1/1995 | La Belle | 73/117 |
| 5,447,060 A | | 9/1995 | Smith et al. | |
| 5,452,605 A | * | 9/1995 | Wilson et al. | 73/117 |
| 5,465,612 A | * | 11/1995 | La Belle | 73/117 |
| 5,531,107 A | * | 7/1996 | Ganzhorn, Jr. | 73/117 |
| 5,657,227 A | | 8/1997 | Freitag | |
| 6,247,357 B1 | * | 6/2001 | Clayton et al. | 73/117 |

FOREIGN PATENT DOCUMENTS

| | | |
|---|---|---|
| DE | 1105637 | 4/1961 |
| DE | 2738325 | 3/1978 |
| DE | 3311543 | 10/1984 |
| EP | 0655617 | 5/1995 |
| EP | 0696729 | 2/1996 |
| FR | 2323996 | 4/1977 |
| GB | 2149520 | 6/1985 |
| JP | 54-33401 | 12/1979 |
| JP | 54-33402 | 12/1979 |
| JP | 54-33403 | 12/1979 |
| JP | 4-278434 | 10/1992 |

OTHER PUBLICATIONS

Hochgeschwindigkeits–Personen–wagen–Trommelpruefstand mit digitalem Fahrsimulator; Mirus et al.; ATZ Automobiltechnische Zeitschrift 86, 1984, 11, pp. 5, 496, 501, 502.

* cited by examiner

Primary Examiner—John Barlow
Assistant Examiner—Demetrius Pretlow
(74) Attorney, Agent, or Firm—W. F. Fasse; W. G. Fasse

(57) ABSTRACT

To correct the loading moment due to the test bench related frictional losses in the simulation of masses on stationary test benches, a correction circuit (10) is connected to a weather detection device (13) which detects the air pressure (P), humidity (φ) and temperature (T), and calculates the air density (ρ) which is transmitted to the correction circuit (10). A loss characteristic function stored in the correction circuit defines the total frictional losses of the test bench, including mechanical friction losses and aerodynamic friction losses which are dependent on the velocity, the weight loading and the air density for a particular test. From the actual existing air density (ρ) and/or the actual weight loading of the roller bearings (G), the correction circuit (10) calculates the air frictional losses and the bearing loading losses, which are then combined with the nominal rated rotational moment so that the loading moment is corrected to the extent of the losses.

17 Claims, 1 Drawing Sheet

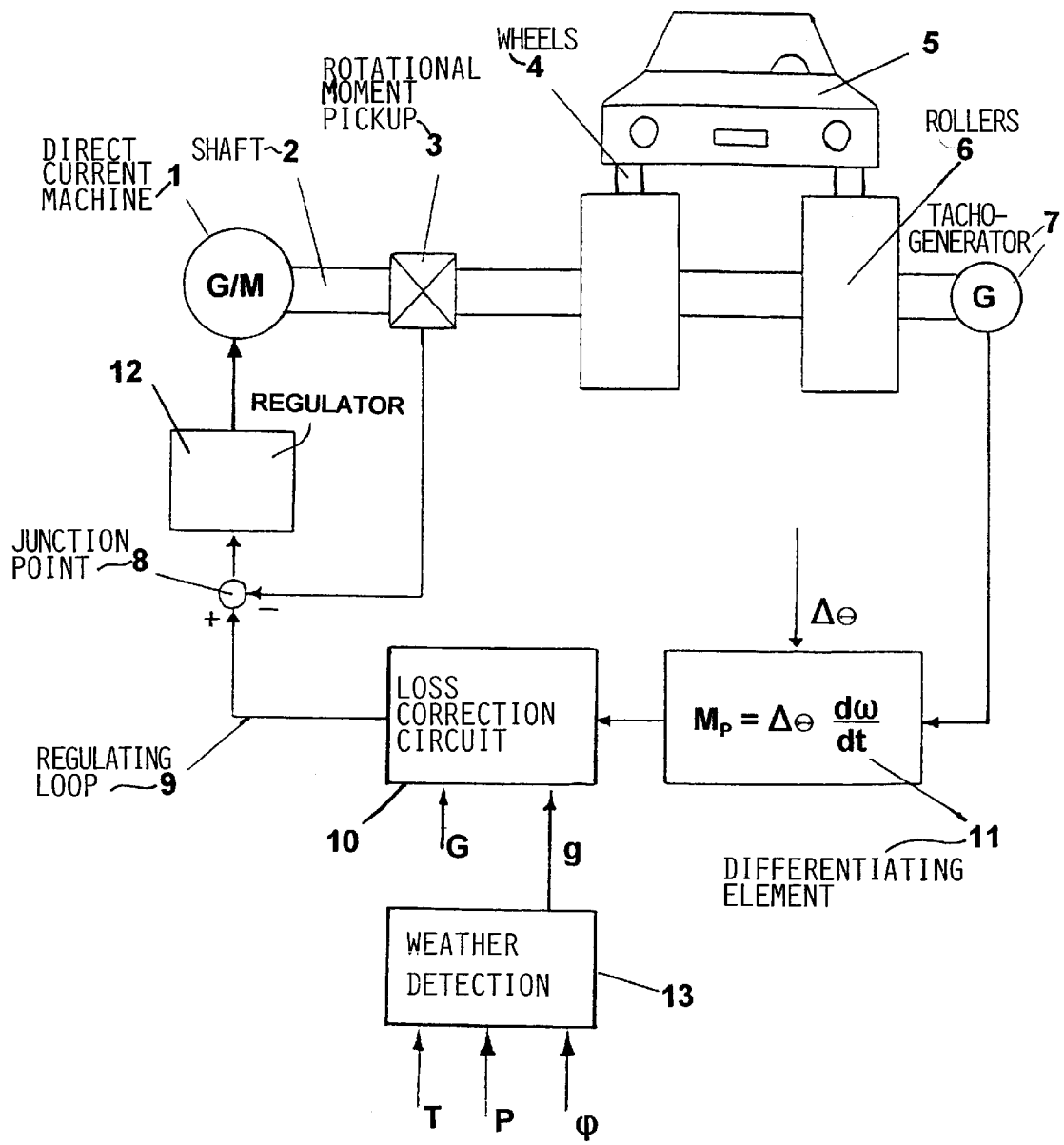

METHOD AND DEVICE FOR TAKING INTO ACCOUNT FRICTION LOSSES DURING THE SIMULATION OF MASSES ON STATIONARY TEST BENCHES

FIELD OF THE INVENTION

The invention relates to a method for correcting the frictional losses during the simulation of masses on stationary test stands or benches, as well as an apparatus for carrying out this method.

BACKGROUND INFORMATION

For carrying out stationary motor vehicle testing, primarily roller test benches are used as stationary test benches. In this context, the drive wheels of a motor vehicle are coupled with the rollers of the test bench with regard to rotational moments. Since the motor vehicles do not move on these test benches, the inertial forces resulting from the acceleration of the motor vehicles mass must be simulated by the test bench, if the mass inertial moment of the test bench does not correspond with that of the motor vehicle mass. In this context it is typical to simulate the difference of the inertial forces through a loading moment, which is, for example, generated by means of a direct current machine. The magnitude of the loading moment is regulated by a dynamic regulation loop or circuit dependent on the respective acceleration.

For example, in order to exactly determine the exhaust gas properties of a motor vehicle determined on such test benches, the automobile industry and the environmental agencies place high demands on the measuring accuracy of such roller test benches. Therefore, the above mentioned loading moment may not be falsified by measuring errors relating to or arising from the test bench. Thus, previously, a great focus of attention has been placed on the selection and the positioning of the test bench bearings, so that the measuring result will not be falsified by bearing friction, to the extent possible. For this reason, it has been a known practice to select bearings having friction values that are as small as possible and are reproducible, which are then taken into account in the measuring result. Thus, it is also a known practice to record a velocity dependent loss characteristic function of the test bench in known time intervals, and to calculate these losses into the rated or nominal values of the load. Thereby, it was possible to achieve and maintain the test bench related measuring errors of <±0.1% of the force nominal value, as required by the U.S. Environmental Protection Agency (EPA).

Nonetheless, these high measuring accuracies can only be maintained if the test bench losses do not vary after recording or taking up the loss characteristic function, or if a new loss characteristic function is taken up or recorded after each variation and is then also taken into account in the simulation. Therefore, such calibrations have been renewed or repeated at certain known time intervals, or upon a change of corresponding influence factors, in order to sufficiently take into account longer term variations of the influence factors. In order to detect all variations over time to the extent possible, the loss characteristic function would basically have to be carried out before each new testing process, which is not practical due to the great effect and expense. Even with such efforts, the changes that arise during the time progression of the test process would still not be detectable, and would then falsify the measuring result.

SUMMARY OF THE INVENTION

It is therefore the object of the invention to provide a method and an apparatus that will take into account as many test stand losses as possible, and especially losses related to a series of time varying changes arising during the testing operation.

The above object has been achieved according to the invention in a method for taking into account frictional losses of a stationary test stand in a simulation of masses on the stationary test stand, in which velocity dependent frictional losses for taring the test stand are determined with the aid of a loss power recording dependent on the velocity at which the test stand is operating. The inventive improvement comprises determining at least one of air frictional losses of the test stand and load dependent bearing frictional losses of the test stand with the aid of the loss power recording together with at least one of an actual existing air characteristic value and an actual existing bearing loading, and correcting a loading moment developed by the test stand on the basis of the air frictional losses or the load dependent bearing frictional losses.

The above object has further been achieved according to the invention in a method of operating a stationary test stand including rotating test stand components for testing a running operation of a motor vehicle on the test stand, comprising a preliminary step of determining a friction loss function that defines a total friction loss of the rotating test stand components, wherein the friction loss function includes at least one of a mechanical friction loss term that is dependent on an operating velocity of the rotating test stand components and a load weight applied to bearings of the rotating test stand components, and an aerodynamic friction loss term that is dependent on the operating velocity and on at least one ambient air characteristic parameter of ambient air surrounding the rotating test stand components, wherein the preliminary step of determining the friction loss function comprises carrying out a calibration run of operating the rotating test stand components at plural velocities, and for each respective velocity of the plural velocities determining and recording a value of the total friction loss of the rotating test stand components at the respective velocity, and recording at least one of the load weight applied to the bearings and the at least one ambient air characteristic parameter pertaining during the calibration run.

The inventive method then further involves testing a motor vehicle on the test stand by positioning the motor vehicle on the test stand by positioning the motor vehicle in drive-transmitting engagement with the test stand components, rotating the test stand components at an operating velocity, measuring or specifying at least one of an operating value of the load weight applied to the bearings based on a weight of the motor vehicle and an operating value of the ambient air characteristic parameter, determining an operating value of the total friction loss of the rotating test stand components by evaluating the friction loss function in connection with at least one of the operating values of the load weight and the operating value of the ambient air characteristic parameter, and exerting a loading moment on the rotating test stand components while correcting the loading moment to compensate for the operating value of the total friction loss of the rotating test stand components.

Also, the invention achieves the above object in a stationary test stand for simulating masses, including an apparatus for taking into account frictional losses on the test stand, comprising a correction circuit that has inputs for at least one actual existing air characteristic value and/or an actual existing bearing loading value, and that calculates a respective air frictional loss of the test stand and/or a respective load dependent frictional loss of the test stand, from the at least one actual existing air characteristic value and/or the actual existing bearing loading value, and that corrects a developed loading moment on the basis of the air frictional loss and/or the load dependent frictional loss.

BRIEF DESCRIPTION OF THE DRAWING

The invention will be described in greater detail in connection with an example embodiment which is shown in the drawing. The single drawing FIGURE shows a schematic illustration of a roller test bench for carrying out the method according to the invention.

DETAILED DESCRIPTION OF THE INVENTION

In general, the illustrated roller test bench includes a regulating loop or circuit 9, which contains a correcting circuit 10 with a weather detection apparatus 13 after a differentiating element 11, and which regulates the loading moment of a direct current machine 1 corresponding to the mass to be simulated.

As shown in the drawing, a direct current machine 1 is rotatably connected with the test bench rollers 6 via a connecting shaft 2. A motor vehicle 5 is schematically illustrated on the test bench rollers 6, wherein the drive wheels 4 of the motor vehicle 5 are connected in a force transmitting manner with the test bench rollers 6. The test bench rollers 6 are further connected, via the same shaft, with a rotation speed detection apparatus 7, which is embodied as a tachogenerator.

A rotational moment pick up 3, which is electrically connected with the regulating loop 9, is arranged on the connecting shaft 2 between the direct current machine 1 and the test bench rollers 6 standing opposite thereto. Thereby, the regulating loop 9 consists of a differentiating element 11, a loss correction circuit 10 to which a weather detection apparatus 13 is connected, a regulator 12 and a junction point 8. The tachogenerator 7 is connected with the differentiating element 11 and this is connected with the loss correction circuit 10. Furthermore, a junction point 8 is provided which is coupled or connected with the input of the regulator 12, the rotational moment pick up 3, and the output of the loss correction circuit 10. On the other hand, the regulator 12 provides, via its output, a regulating signal to the direct current machine 1.

The weather detection apparatus 13 connected to the loss correction circuit 10 contains measuring sensors for the pressure P, the temperature T, and the moisture or humidity Φ of the air. From these, this apparatus forms a value that is proportional to the air density ρ and is provided to the loss correction circuit 10. The weather detection apparatus 13 may, however, also be integrated into the loss correction circuit 10, if means for detecting the air parameters are provided, from which the air density ρ can be determined. The loss correction circuit 10 furthermore contains an input or means through which the weight of the test specimen and/or the weight of the test bench rollers can be input or detected. In any case, a value of the air density ρ and a value of the motor vehicle weight G and the test bench roller weight is provided to the loss correction circuit 10, and serves for determining the weight dependent bearing friction and the losses due to the generation of air turbulence on the rotating test bench components.

The above described apparatus operates according to the following method steps: In the testing of a motor vehicle 5 on a roller test bench, the motor vehicle 5 as a test specimen drives the test bench rollers 6 via the motor vehicle wheels 4. Thereby, the tachogenerator 7 and the direct current machine 1 are simultaneously moved therewith via the connecting shaft 2. Thereby, the tachogenerator 7 produces a signal that is proportional to the velocity or the angular velocity ω. The loading moment necessary for the simulator of masses is produced by means of the direct current machine 1, of which the desired loading moment is controlled by a rotational moment regulator 12. By means of the rotational moment pick up 3, the rotational moment of the connecting shaft 2 is respectively detected, which corresponds to the actual existing rotational moment.

Since two rotational moments $M_P$ and $M_F$ influence or affect the physically present test bench inertial moment $\Theta_P$, it can be assumed that a correct simulation of masses only exists if the test bench rotational moment $M_P$ is prescribed in such a manner that the inertial moment of the test bench $\Theta_P$ undergoes the same acceleration as the vehicle 5 by itself would experience on the street under the influence of the motor vehicle rotational moment $M_F$. Since in this ideal simulation of masses, unfortunately the motor vehicle rotational moment $M_F$ is only directly measurable in the rarest cases, this must be determined, in the majority of cases, indirectly on the basis of its acceleration effect (dω/dt) on the test bench inertial mass $\Theta_P$. For mathematically determining the motor vehicle rotational moment $M_F$ it must be assumed as a starting point, that the mass acceleration of the entire test bench is as large as the acceleration of the motor vehicle. Thereby, a conclusion can be reached as to the causational motor vehicle rotational moment $M_F$ that is to be determined, from the determined acceleration (dω/dt) and the known motor vehicle inertial moment $\Theta_F$. Thus, mathematically:

$$M_P=(\Theta_F-\Theta_P)d\omega/dt=\Delta\Theta d\omega/dt$$

Finally, the loading rotational moment that is to be generated and the roller acceleration in the stationary condition can be derived from this mathematical relationship. This basically represents the structure of the known simulation of masses according to the differentiating method. Thus, in such a regulating method, in practice, a rotational moment regulator 12, which determines and regulates the desired loading moment $M_P$, can be conceived out of the differentiation of the angular velocity signal dω/dt and the prescribed mass inertial moment $\Theta_F$ of the vehicle and of the test bench $\Theta_P$. Thereby, a variable rotational moment rated or nominal value is determined from the differentiating angular velocity signal dω/dt of the tachogenerator 7 and while taking into consideration the known mass inertial moment $\Theta_F$ of the vehicle and of the test bench $\Theta_P$. This rotational moment rated or nominal value is compared with the actual rotational moment determined by the rotational moment pick up 3, and in the event of a possible deviation, the loading machine 1 is controlled by a regulator 12 in such a manner so that this loading moment acts as a simulation of masses.

In this known mass simulation method, however, an error arises, which is caused by the frictional losses of the roller test bench. Thus, frictional losses are generated in the test bench bearings, which are primarily dependent on the structural measures of the bearings. Modern bearing constructions possess absolutely small bearing frictions and reproducible velocity dependent frictional values, so that these are determinable with a loss curve recording, and can be taken into account in the determined of the rated or nominal value of the rotational moment.

However, frictional losses also arise in the test bench, which basically cannot reproducibly be taken into account, and previously also have not been taken into account, due to their great wealth of variations. Thus, there exists in addition to the velocity dependent bearing friction, additionally a load dependent bearing friction, which is dependent not only on the roller weight, but also on different motor vehicle weights. Since the loss curve of the test bench in the previous practice has only been determined at one operating point without motor vehicle loading, various different motor vehicle loadings will also provide different load dependent bearing frictions, which lead to an error in the mass simulation. Similarly, frictional losses arise in the test bench due to follow processes on the surfaces of rotating components, which are also dependent on the physical characteristics of the air, whereby the density of the air goes linearly into the velocity dependent air friction term. The air density in turn is dependent on pressure, temperature and humidity of the air. Since these weather conditions can continuously change, the required invariability of these frictional components cannot be reliably ensured. This is true even in air-conditioned or climate-controlled spaces, because the testing cabins are generally not embodied in a pressure-tight manner. Thereby, the specific weight or density of the air varies due to the weather influences by about 10 to 12.5%, pure air pressure variations lie in the range of approximately 5%. Additionally, there is the dependence of the specific weight or density on the air moisture content or humidity, whereby moist air is lighter than dry air. This effect becomes greater with increasing temperature and can amount to a few percent. This influence on the test bench conditions is especially not to be neglected in open-air test benches. Absolutely, there arises thereby a possible variation of the air frictional losses up to approximately 0.1% measuring accuracy in a middle or average velocity range. Due to the quadratic mathematical relationship, this influence becomes considerably greater in higher velocity ranges, which are especially evermore frequently being carried out in present day long duration running tests.

In previous methods, such errors caused by weather were not at all taken into account in their variation, but instead were simply indirectly determined with the recording of the loss characteristic function during a weather condition. Such measuring errors due to variations of the weather condition, which evermore strongly arise in long duration running tests, can, by themselves, already exceed desired measuring accuracies of ±0.1% of the end values of the tension measuring range, so that they can no longer be neglected.

The basic idea of the invention is to determine the test bench parameters for the various different frictional losses at one operating point by recording a loss characteristic function, and to computationally take into account the time varying losses by detecting or acquiring the influence parameters. Thus, the frictional losses $F_V$ of a roller test bench are made up of the two components bearing friction $F_{La}$ and air friction $F_{Lu}$. A model of the frictional losses is mathematically to be described as:

$$F_V = F_{La} + F_{Lu}$$

For the two components, the following mathematical models can be set up, which contain the dominating components:

$$F_{La} = c_1 G + c_2 V^{2/3}$$

$$F_{Lu} = c_2 \rho v^2$$

whereby
V=velocity
G=weight of the bearing loading
$\rho$=air density
$c_1$ to $c_3$=test bench coefficients.

Thereby, there is given the following model for the losses of the roller test bench:

$$F_V = c_1 G + c_2 v^{2/3} + c_3 \rho v^2$$

Since the selected model is linear in the test bench coefficients $c_1$ to $c_2$, a linear equation system can be set up with the aid of a measured loss curve, whereupon this linear equation system can be solved according to the coefficient to be determined. In this context, a system for taking up or recording the loss curve has been practically found to be useful, while operates with 256 velocity support locations, whereby the test bench coefficients $c_1$ to $c_3$ can be calculated from these values. In any case, the test bench coefficients must be detected or acquired in at least three velocity ranges. In this context, one velocity range should be provided at a small velocity near 0, in connection with which the load dependent bearing friction is dominant. Moreover, a loss recording would have to be carried out at a middle or average velocity, for which the velocity dependent bearing friction is relatively clearly predominant. Moreover, a loss characteristic function in a high velocity range is advantageous, because due to the quadratic air friction component, this value explicitly arises there.

In the loss correction circuit 10, during the loss recording, first the test bench coefficients $c_1$, $c_2$, $c_3$ that are to be found are calculated and stored with the aid of the values for the air density $\rho$, and the roller weight G dependent on the associated velocity ranges for all measuring points. These coefficients $c_1$, $c_2$, $c_3$ can be determined particularly exactly, if the calculation is carried out in the sense of the Gaussian method of least squares from a highest possible series or set of measured values.

In the following motor vehicles tests, the respective test bench losses are calculated with the aid of the acquired weather data values T, P and $\phi$ and the prescribed or acquired vehicle weight G. This calculation is possible during the testing operation, because the test bench coefficients have been previously calculated and stored in the correction circuit. Since for each change of the weather conditions and each motor vehicle change, the corresponding changed values are detectable or inputtable, the respective associated loss power of the test bench can be calculated on-line.

These respective frictional losses are combined in the correction circuit 10 with the rated or nominal rotational moment $M_P$ determined by the differentiating element 11, and provide a rated or nominal rotational moment that has been cleaned-up with respect to the losses. This is then compared at the junction point 8 with the actual existing rotational moment provided by the actual value pick 3, whereby the difference thereof is regulated-out with the aid of the regulator 12. Thereupon, the direct current machine 1 generates a rotational moment with the aid of which the vehicle mass will be simulated through the roller test bench.

The correction circuit 10 in this context can be embodied as an electronic circuit, or can be represented as a calculating program for a calculating circuit. This computer circuit can also be integrated into the differential element 11 or may represent a component of the test bench computer.

Such a method for the loss correction of variable frictional losses can also be used for flat track test benches or other test benches of which the frictional losses are dependent on the test specimen weight and/or the physical air characteristics.

What is claimed is:
1. In a method for taking into account frictional losses of a stationary test stand in a simulation of masses on the stationary test stand, in which velocity dependent frictional losses for taring the test stand are determined with the aid of a loss power recording dependent on the velocity at which the test stand is operating, an improvement comprising determining at least one of air frictional losses of the test stand and load dependent bearing frictional losses of the test stand with the aid of the loss power recording together with at least one of an actual existing air characteristic value and an actual existing bearing loading, and correcting a loading moment developed by the test stand on the basis of the air frictional losses or the load dependent bearing frictional losses.

2. The improvement in the method according to claim 1, further comprising, in connection with the loss power recording, also recording bearing loadings, and air characteristic values, and therefrom calculating test stand related coefficients ($c_1$, $c_2$, $c_3$), and then forming an actual existing air frictional loss or an actual existing load dependent frictional loss from the actual existing air characteristic value or the actual existing bearing loading respectively together with respective ones of the coefficients.

3. The improvement in the method according to claim 2, further comprising calculating an air density ($\rho$) from a plurality of the actual existing air characteristic values comprising the air pressure (P), the air humidity ($\phi$) and the air temperature (T), and determining the actual existing air frictional loss with the aid of at least one of the test stand related coefficients ($c_1$, $c_2$, $c_3$) together with the air density.

4. The improvement in the method according to claim 2, wherein the actual existing bearing loading comprises a prescribed or determined motor vehicle weight, and further comprising calculating the actual existing load dependent frictional loss on the basis of the prescribed or determined motor vehicle weight (G) and at least one of the test stand related coefficients ($c_1$, $c_2$, $c_3$).

5. The improvement in the method according to claim 2, further comprising correcting the loading moment to the extent of the total frictional losses by combining the actual existing load dependent frictional loss and the actual existing air frictional loss with a respective nominal rated rotational moment.

6. A stationary test stand for simulating masses, including an apparatus for taking into account frictional losses on the test stand, comprising a correction circuit (10) that has inputs for at least one actual existing air characteristic value and an actual existing bearing loading value (G), and that calculates at least one of a respective air frictional loss of the test stand and a respective load dependent frictional loss of the test stand from the at least one actual existing air characteristic value or the actual existing bearing loading value respectively, and that corrects a developed loading moment on the basis of at least one of the air frictional loss and the load dependent frictional loss.

7. The stationary test stand according to claim 6, further comprising a weather detection apparatus (13), which detects the actual existing air characteristic values including an air pressure (P), an air temperature (T), and an air humidity ($\phi$), and therefrom determines actual existing air density values ($\rho$), which are provided to the correction circuit (10).

8. The stationary test stand according to claim 6, wherein the correction circuit (10) is embodied as an electronic circuit, or represents a calculating program at a calculating circuit.

9. A method of operating a stationary test stand including rotating test stand components for testing a running operation of a motor vehicle on said test stand, comprising a preliminary step of determining a friction loss function that defines a total friction loss of said rotating test stand components, wherein said friction loss function includes at least one of a mechanical friction loss term that is dependent on an operating velocity of said rotating test stand components and a load weight applied to bearings of said rotating test stand components, and an aerodynamic friction loss term that is dependent on said operating velocity and on at least one ambient air characteristic parameter of ambient air surrounding said rotating test stand components, and wherein said preliminary step of determining said friction loss function comprises carrying out a calibration run of operating said rotating test stand components at plural velocities, and for each respective velocity of said plural velocities determining and recording a value of said total friction loss of said rotating test stand components at said respective velocity, and recording at least one of said load weight applied to said bearings and said at least one ambient air characteristic parameter pertaining during said calibration run.

10. The method according to claim 9, after said preliminary step further comprising testing a motor vehicle on said test stand by positioning said motor vehicle on said test stand with a wheel of said motor vehicle in drive-transmitting engagement with said test stand components, rotating said test components at an operating velocity, measuring or specifying at least one of an operating value of said load weight applied to said bearings based on a weight of said motor vehicle and an operating value of said ambient air characteristic parameter, determining an operating value of said total friction loss of said rotating test stand components by evaluating said friction loss function in connection with at least one of said operating value of said load weight and said operating value of said ambient air characteristic parameter, and exerting a loading moment on said rotating test stand components while correcting said loading moment to compensate for said operating value of said total friction loss of said rotating test stand components.

11. The method according to claim 10, wherein said friction loss function includes said mechanical friction loss term, said calibration run comprises recording said load weight, and said testing of said motor vehicle comprises measuring or specifying said operating value of said load weight based on said weight of said motor vehicle and comprises evaluating said friction loss function in connection with said operating value of said load weight.

12. The method according to claim 11, wherein said friction loss function further includes said aerodynamic friction loss term, said calibration run further comprises recording said at least one ambient air characteristic parameter, and said testing of said motor vehicle further comprises measuring or specifying said operating value of said ambient air characteristic parameter and further comprises evaluating said friction loss function further in connection with said operating value of said ambient air characteristic parameter.

13. The method according to claim 12, wherein said calibration run is carried out at said plural velocities in three distinct velocity ranges including a first relatively lowest velocity range in which a first component of said mechanical friction loss term that is dependent on said load weight is dominant in said friction loss function, a second intermediate velocity range in which a second component of said mechanical friction loss term that is dependent on said operating velocity is dominant in said friction loss function, and a third relatively highest velocity range in which said aerodynamic friction loss term is dominant in said friction loss function.

14. The method according to claim 12, wherein said determining of said friction loss function further comprising determining test stand related coefficients that are included in said mechanical friction loss term and said aerodynamic friction loss term, and that define a load dependent and ambient air dependent frictional loss behavior of said rotating test stand components.

15. The method according to claim 14, wherein said friction loss function is defined mathematically as $F = c_1 G + c_2 v^{2/3} + c_3 \rho v^2$, wherein $c_1$, $c_2$, and $c_3$ are said test stand related coefficients, G is said load weight, v is said operating velocity, and $\rho$ is said operating value of said ambient air characteristic parameter comprising an air density of said ambient air.

16. The method according to claim 10, wherein said friction loss function includes said aerodynamic friction loss term, said calibration run comprises recording said at least one ambient air characteristic parameter, and said testing of said motor vehicle comprises measuring or specifying said operating value of said ambient air characteristic parameter and comprises evaluating said friction loss function in connection with said operating value of said ambient air characteristic parameter.

17. The method according to claim 14, wherein aid ambient air characteristic parameter is an air density of said ambient air, and said measuring or specifying said operating value of said ambient air characteristic parameter comprises measuring an air temperature, an air pressure, and an air humidity of said ambient air and therefrom determining said air density.

* * * * *

UNITED STATES PATENT AND TRADEMARK OFFICE
CERTIFICATE OF CORRECTION

PATENT NO. : 6,577,973 B1
DATED : June 10, 2003
INVENTOR(S) : Freitag

It is certified that error appears in the above-identified patent and that said Letters Patent is hereby corrected as shown below:

Title page,
Item [73], Assignee, replace "Schenk" by -- Schenck --;

Column 1,
Line 19, after "motor", replace "vehicles" by -- vehicle --;
Line 60, after "great", replace "effect" by -- effort --;

Column 2,
Line 45, after "stand", replace "by positioning" by -- with a wheel of --;
Line 54, after "operating", replace "values" by -- value --;

Column 3,
Line 5, before "BRIEF DESCRIPTION OF THE DRAWING", insert the following two paragraphs:

--The invention has the advantage, that basically the test bench related losses, by recording a single loss characteristic function, can be continuously detected or acquired and computationally taken into account in the measuring result. Thereby, the measuring results determined on the test bench at least remain constant in time with respect to their measuring error, even if the influence factors such as the temperature, the air pressure, the air humidity and/or the loading due to different test specimen weights change between the recordings of the loss characteristic function.

Furthermore, the invention has the advantage that the conditions that pertain during the calibration of the test bench do not have to be maintained or satisfied during a motor vehicle testing process, because these conditions are computationally taken into account directly by detecting or acquiring the influence factors and previously calculating the test bench coefficients.--

Line 29, after "with a", replace "rotation" by -- rotational --;
Line 49, before "of the air", replace "ϕ" by -- φ --;

Column 4,
Line 5, replace "for the", replace "simulator" by -- simulation --;
Line 34, replace "$M_P=(\Theta_F-\Theta_P)d\omega/dt=\Delta\Theta d\omega/dt$" by -- $M_P=(\Theta_F-\Theta_P)\frac{d\omega}{dt} = \Delta\Theta\frac{d\omega}{dt}$ --;

Line 63, after "in the", replace "determined" by -- determination --;

UNITED STATES PATENT AND TRADEMARK OFFICE
CERTIFICATE OF CORRECTION

PATENT NO. : 6,577,973 B1
DATED : June 10, 2003
INVENTOR(S) : Freitag

It is certified that error appears in the above-identified patent and that said Letters Patent is hereby corrected as shown below:

Column 5,
Line 11, after "to", replace "follow" by -- flow --;
Line 44, after "end", replace "values" by -- value --;

Column 6,
Line 11, after "useful,", replace "while" by -- which --;
Line 33, after "motor", replace "vehicles" by -- vehicle --;

Column 7,
Line 60, after "program", replace "at" by -- of --;

Column 8,
Line 25, after "test", insert -- stand --;

Column 9,
Line 2, after "further", replace "comprising" by -- comprises --.

Signed and Sealed this

Seventh Day of October, 2003

JAMES E. ROGAN
*Director of the United States Patent and Trademark Office*